(12) United States Patent
Franks

(10) Patent No.: US 6,241,849 B1
(45) Date of Patent: Jun. 5, 2001

(54) METHODS FOR DEINKING AND DECOLORIZING PRINTED PAPER

(75) Inventor: Neal E. Franks, Raleigh, NC (US)

(73) Assignee: Novo Nordisk Biochem North America, Inc., Franklinton, NC (US)

( * ) Notice: Subject to any disclaimer, the term of this patent is extended or adjusted under 35 U.S.C. 154(b) by 0 days.

(21) Appl. No.: 09/397,788

(22) Filed: Sep. 16, 1999

Related U.S. Application Data

(63) Continuation-in-part of application No. 09/156,734, filed on Sep. 7, 1998, now abandoned.

(51) Int. Cl.[7] .................................................. D21C 5/02
(52) U.S. Cl. .................................. 162/5; 162/6; 162/191
(58) Field of Search .......................... 162/5, 72 B, 162, 162/191, 6, 8

(56) References Cited

U.S. PATENT DOCUMENTS 5,560,805 * 10/1996 Hamilton et al. .......................... 162/5
5,837,097 * 11/1998 Egawa et al. ............................. 162/5
5,879,509 * 3/1999 Sharyo et al. ............................. 162/5

FOREIGN PATENT DOCUMENTS

4116133 * 5/1991 (DE) .
0 717 144 A1 12/1995 (EP) .
2 304 741 8/1995 (GB) .

OTHER PUBLICATIONS

Fluet et al., 1997, Progress In Paper Recycling, pp. 74–79.
Forsberg et al., 1994, Tappi Journal, vol. 77, No. 3: pp. 253–259.
Eriksson et al., 1997, Tappi Journal, vol. 80, No. 6: pp. 80–81.

* cited by examiner

Primary Examiner—Dean T. Nguyen
(74) Attorney, Agent, or Firm—Robert L. Stames

(57) ABSTRACT

The present invention relates to methods for deinking and decolorizing a printed paper, comprising: (a) pulping the printed paper to obtain a pulp slurry; (b) dislodging an ink from the pulp slurry with one or more enzymes; (c) decolorizing the dye contained in the pulp slurry with one or more laccases in the presence of oxygen and optionally one or more chemical mediators; (d) separating the released ink from the pulp slurry; and (e) recovering the decolorized pulp. The present invention also relates to decolorized pulps prepared by such methods and to methods for producing recycled paper.

40 Claims, 2 Drawing Sheets

Current Practice:

| Chemicals | | |
|---|---|---|
| | NaOH, 0 -2 % | NaOCl |
| | Na Silicate, 0 - 3% | $O_2/H_2O_2$ |
| | $H_2O_2$, 0 - 2% | Sodium Hydrosulfite |
| | Surfactant, Soap | FAS |
| | Added Ca++ | |
| pH | 8 - 11.5 | |
| Temp., C | 30 - 55 | |
| Time, min. | 20 - 40 | |

Present Invention:

| Chemicals | | | |
|---|---|---|---|
| | Enzymes Surfactant(s) | Laccase/ Mediator | Sodium Hydrosulfite FAS |
| pH | 5.5 - 8.5 | 5.5 - 9 | |
| Temp., C | 40 - 65 | 35 - 55 | |
| Time, min. | 15 - 45 | 30 - 90 | |

METHODS FOR DEINKING AND DECOLORIZING PRINTED PAPER

CROSS-REFERENCE TO RELATED APPLICATION

This application is a continuation-in-part of U.S. application Ser. No. 09/156,734 filed on Sep. 17, 1998 now abandoned, which application is fully incorporated herein by reference.

BACKGROUND OF THE INVENTION

1. Field of the Invention

The present invention relates to methods for deinking and decolorizing printed paper.

2. Description of the Related Art

Printed waste paper is an important source for producing recycled paper. Recycling of printed waste paper generally requires deinking and bleaching of the printed waste paper to a suitable brightness before being used in the production of recycled paper.

Current industrial deinking/pulp brightening practices are schematically shown in FIG. 1. The waste paper is first repulped at moderate to high consistency (6–20%) in water followed by deinking of the pulp. The deinking step is essentially a separation method employing chemicals, heat, and mechanical energy to dislodge ink or toner particles from the fibers. The traditional approach to deinking is to break down the ink particles to a fine size using mechanical action in the presence of conventional chemicals, e.g., caustics, surfactants, and hydrogen peroxide. The chemical systems mainly used in deinking waste papers employ an alkaline system usually with hydrogen peroxide to maintain pulp brightness and impede alkaline "darkening" of those pulp fibers which originate from groundwood containing papers. The surfactants used in the alkaline deinking systems are generally synthetic detergent formulations or fatty acid soaps. In the latter case, additional calcium may be required to enhance the action of these materials, but which can also form unwanted deposits around the deinking process. After sufficient pulping time to achieve dislodging of the ink particles from the fiber surface, the pulp slurry is diluted to a lower pulp consistency, and held for a period in a dump chest.

The pulp is then usually further diluted and other contrary materials removed via centrifugal cleaning and screening. At this point, the pulp is directed to the flotation stage where air is introduced into the pulp slurry. The ink particles adsorb to the air bubbles and are carried to the top of the pulp slurry forming a foam due to the presence of the surfactant or soap preparations. The foam is then separated from the rest of the mixture by mechanical means. One newer technology employs chemical-mechanical deinking based on densification chemistry to increase the size of the dislodged ink particles which then can be removed by centrifugal cleaning and screening.

After flotation, the pulp is thickened and stored for papermaking use, or is post-treated to improve the brightness of the pulp prior to papermaking. The post-treatment is separate from the pulping/deinking process. For those papers contained in the waste stream to which some form of coloration was applied, dye-stripping of the pulp typically involves chlorine-based bleaching or chlorine-free bleaching.

Chlorine-based bleaching routinely uses elemental chlorine or sodium hypochlorite bleaching sequences which produce the maximum contaminant destruction, color removal, and brightness increase. However, hypochlorite is not effective with furnishes containing more than about 10% mechanical pulp. Furthermore, chlorine-based bleaching sequences are environmentally unfriendly. Chlorine-free bleaching uses oxygen, ozone, hydrogen peroxide, sodium hydrosulfite (reductive), or formamidine sulfinic acid (reductive). However, these bleaching agents either provide only moderate improved brightness of the pulp, are expensive, are ineffective, or can adversely affect the properties of the pulp.

The object of the present invention is to provide improved methods for deinking and decolorizing printed paper.

SUMMARY OF THE INVENTION

The present invention relates to methods for deinking and decolorizing a printed paper, comprising:

(a) pulping the printed paper to obtain a pulp slurry;
(b) dislodging an ink from the pulp slurry with one or more enzymes;
(c) decolorizing the dye contained in the pulp slurry with one or more laccases in the presence of oxygen and optionally one or more chemical mediators;
(d) separating the released ink from the pulp slurry; and
(e) recovering the decolorized pulp.

The present invention also relates to deinked and decolorized pulps obtained from such methods and to methods for producing recycled paper.

DETAILED DESCRIPTION OF THE INVENTION

The methods of the present invention involve an integrated enzymatic system which accomplishes the results achieved using conventional deinking/pulp brightening practices, but in a manner where the pulping, ink dislodging, and dye decolorizing steps are combined integrally at the front end of the process under preferably ambient conditions.

The methods of the present invention comprise (a) pulping the printed paper to obtain a pulp slurry; (b) dislodging an ink from the pulp slurry with one or more enzymes; (c) decolorizing the dye contained in the pulp slurry with one or more laccases in the presence of oxygen and optionally one or more chemical mediators; (d) separating the released ink from the pulp slurry; and (f) recovering the decolorized pulp.

The term "paper" is defined herein to be generic to a variety of cellulosic sheet materials including filled and unfilled papers. The printed paper may be any type of paper useful in the practice of the present invention, but preferably photocopy printed paper, laser-jet-printed paper, computer printouts, white ledger, colored ledger, newsprint, magazine paper, or any combination of the foregoing.

Figure 2:
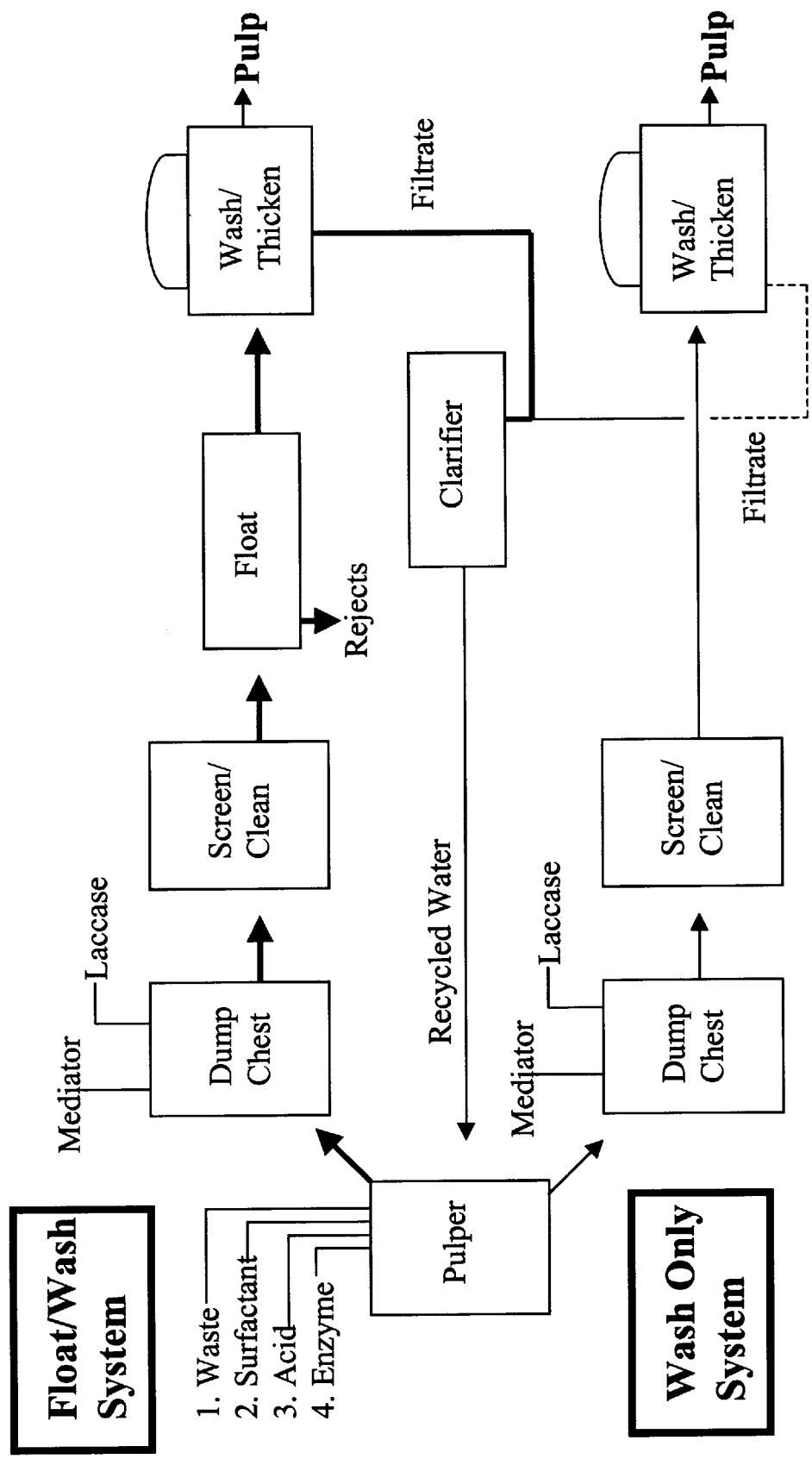
FIG. 2 shows a schematic diagram for deinking and decolorizing printed paper according to the present invention.

The pulping and dislodging steps as shown in FIG. 2 are performed in the presence of several classes of enzymes which have an effect in separating ink particles from the pulp fibers. Such enzymes include, but are not limited to, an amylase, cellulase, hemicellulase, lipase, pectin methylesterase, protease, and xylanase. In addition to the enzymes present at this stage, the addition of a surfactant can also be advantageous in assisting this process. In contrast to the pH conditions conventionally employed, the use of enzymes allows the process to proceed preferably at or near neutral pH. This neutral pH prevents the extraction of materials from the paper matrix which could cause deposit problems, problems in the water recycle loop, or later in the paper making process; all issues incurred at higher pH ranges.

At the end of the pulping and dislodging of the ink, the pulp is diluted on its way to a dump chest where one or more laccases are added optionally with a chemical intermediate termed a mediator. Agitation of the pulp mixture provides oxygen to the laccase which converts the mediator to an activated form. The activated mediator then diffuses into the pulp fiber and reacts oxidatively with the dye molecule adsorbed on/in the pulp fiber. This reaction converts the dye to a less colored form. The decolorization is, therefore, an extension of the pulping/dislodging step.

At the end of this reaction time, the process differs little from the mechanical steps as practiced currently.

The methods of the present invention are particularly advantageous in that the pulping, dislodging, decolorizing, and deinking steps are performed as an integrated process in the absence of chemical brightening/bleaching agents which adversely affect waste water and/or environment. Another advantage is the methods of the present invention can be retrofitted onto process steps already in place in the paper industry without the need to add new process equipment or to extensively modify equipment in place.

Pulping of Printed Waste Paper

The conversion of the printed paper to a pulp slurry may be conducted using any of the various conventional processes and equipment designed for this purpose to produce an aqueous slurry of fibers. The pulping of waste paper may be performed commercially in several styles of pulpers such as the Black Clawson Hydrapulper or the Helico high consistency manufactured by the Lodding Division of Thermo Electron. For example, see Smook, *Handbook for Pulp & Paper Technologists*, $2^{nd}$ edition, Angus Wilde Publications, Vancouver, 1992, pages 194–195.

The term "consistency" is defined herein as the percent weight in grams of oven dry fiber in 100 grams of a pulp-water mixture. The consistency of pulp suspensions may be determined according to TAPPI Method T 240 om-93. The consistency during pulping may range from about 3% to 25%, preferably from about 5% to about 20%, more preferably from about 10% to about 20%, and most preferably from about 12% to about 18%.

The water used in the pulping step may be water recovered from the thickening stage of the process which has undergone an intermediate water clarification step to remove fines and contraries from this reclaimed water stream.

The pulping may be conducted at any pH and temperature known in the art suitable for converting the printed paper to a pulp slurry. The pH of the aqueous pulping solution may range from about pH 4.5 to about pH 10, preferably from about pH 5.5 to about pH 9, more preferably from about pH 6 to about pH 8.5, and most preferably from about pH 6.5 to about pH 8. The temperature of the aqueous pulping solution may range from about 25° C. to about 75° C., preferably from about 30° C. to about 70° C., more preferably from about 30° C. to about 65° C., and most preferably from about 35° C. to about 60° C.

Dislodging of Ink from Printed Waste Paper

In the methods of the present invention, the dislodging of the ink from the pulp is conducted with one or more enzymes. The enzymatic dislodging step may be conducted simultaneously with the pulping step, partially simultaneously with the pulping step, or separately from the pulping step. The dislodging step may also be useful in removing coatings from the pulp.

Ink will herein include toner. There are several classes of inks used to impart an image to paper. The non-contact inks are thermoplastic in nature, and are applied via an electrostatic process. After removal of the excess ink from the non-charged areas of the paper, the residual ink is fused so that it remains with the paper. In most cases, the papers used for this type of application will contain high proportions of bleached chemical pulps in combination with a pigment like calcium carbonate. The removal of the fused inks presents a challenge to which enzymatic treatment is ideally suited. For contact printing methods like letterpress and offset ink application methods, the pigment is contained in some type of binder, and this system is applied with a carrier which will migrate into the paper structure leaving the pigment:binder complex on the surface. Since a high proportion of the papers printed with these methods contain mechanical pulps, traditional deinking methods have involved the use of alkaline systems.

The term "coating" usually refers to a mixture which is applied to the paper after manufacture which can represent as much as one-third of the weight of the finished paper. Coatings are used to improve the optical and surface properties of the finished paper. Coating formulations will vary from one region to another, but they can contain starch, an organic binder of some type, a pigment like kaolin, and other additives to help improve the final optical and printing properties of the paper.

Sizing application implies that a lower proportion of the finished paper is comprised of this material, and it can be applied by adding the sizing to the papermaking furnish (internal), or by an applicator called a size press (external). Starch can serve in both applications, but other materials may be used which provide a hydrophobic surface to the paper.

The dislodging step may be conducted in the pulping equipment, for instance, by simply adding the enzyme(s) to the aqueous pulp slurry in the equipment used to pulp the wastepaper, e.g. a hydrapulper. Alternatively, the dislodging may be carried out using separate processing equipment which provides for agitation and temperature control of the pulp slurry.

In a preferred embodiment, the printed paper is completely pulped prior to dislodging, specifically from about 20 minutes to about 120 minutes, to produce a pulp slurry with no visible fiber bundles.

In another preferred embodiment, the printed paper is partially pulped for about 2 minutes to 10 minutes to produce a roughly pulped paper that contains fiber bundles visible to the naked eye. Then dislodging and continued pulping are conducted simultaneously.

In a more preferred embodiment, the enzymatic dislodging step is conducted simultaneously with the pulping step. In a most preferred embodiment, the enzymatic dislodging step is conducted simultaneously with the pulping step for about 20 to about 120 minutes at about 35° C. to about 75° C.

The enzymatic dislodging step may be performed with any enzyme known in the art which can dislodge ink particles contained in the pulp. See, for example, Zollner, 1997, Volume 58/11-B of Dissertations Abstracts International, page 5950; Jeffries et al., 1994, *Tappi Journal* 77:173–179; Kim et al., *Proceedings of the* 1991 *Tappi Conference,* pp. 1023–1030; Prasad et al., 1993, *Appita* 46:289–292; and Prasad et al., 1993, *Nordic Pulp and Paper Journal* 2: 284–286; U.S. Pat. No. 5,370,770; and GB 2 304 741, WO 91/14819, and WO 92/20857.

In a preferred embodiment, the enzyme is an amylase, cellulase, hemicellulase, lipase, pectin methylesterase, protease, xylanase, or any combination of the foregoing. In a preferred embodiment, a mixture of these enzymes is used.

Commercially available amylases useful in the present invention are AQUAZYM® (a *Bacillus subtilis* alpha-amylase, available from Novo Nordisk A/S, Denmark), BAN (a *Bacillus amyloliquefaciens* alpha-amylase, available from Novo Nordisk A/S, Denmark), TERMAMYL® (a *Bacillus licheniformis* amylase, available from Novo Nordisk A/S, Denmark). Commercially available cellulases useful in the present invention are NOVOZYM® 342 (a *Humicola insolens* cellulase, available from Novo Nordisk A/S, Denmark), NOVOZYM® 476 (a monocomponent *Humicola insolens* cellulase, available from Novo Nordisk A/S, Denmark), and NOVOZYM® 613 (a monocomponent *Humicola insolens* cellulase, available from Novo Nordisk A/S, Denmark). A commercially available xylanase useful in the present invention is PULPZYM® (a Bacillus xylanase, available from Novo Nordisk A/S, Denmark). A commercially available pectin methylesterase useful in the present invention is NOVOZYM® 863 (an *Aspergillus niger* pectin methylesterase, available from Novo Nordisk A/S, Denmark). Commercially available proteases useful in the present invention are NEUTRASE® (a *Bacillus amyloliquefaciens* endoprotease, available from Novo Nordisk A/S, Denmark), and ALCALASE® (a *Bacillus licheniformis* endoprotease, available from Novo Nordisk A/S, Denmark). A commercially available lipase useful in the present invention is RESINASE™ A 2× (a *Thermomyces lanuginosus* lipase, available from Novo Nordisk A/S, Denmark).

The amount of enzyme used in the dislodging step should be in an amount effective to achieve an efficient diffusion rate such that substantially all of the pulp fiber (generally greater than about 70%, preferably greater than about 80%, and most preferably greater than about 90%) comes into contact with the enzyme component(s). Determining a sufficient amount of the enzyme is within the skilled art. The amount of enzyme is generally in the range from about 0.007% to about 0.06%, preferably from about 0.015% to about 0.03%, and most preferably from about 0.02% to about 0.025%, by weight of the pulp slurry.

The consistency of the pulp during the dislodging step may range from about 3% to about 25%, preferably from about 5% to about 20%, more preferably from about 10% to about 20%, and most preferably from about 12% to about 18%. In a preferred embodiment, the consistency of the pulp during dislodging is the same as that during pulping.

If the pH of the pulp slurry is not compatible with the optimal activity of the enzyme(s), the pulp slurry may need to be pH adjusted particularly before addition of the enzyme(s). The need for pH adjustment may not be necessary, especially if the enzyme(s) has optimal activity compatible with the pH of the pulp slurry.

The need for pH adjustment may depend on the waste paper feedstock used. Traditionally, even the so-called "white" or wood-free papers employed acidic conditions which included alum and an acidic sizing material. This practice is in transition, and the same grade of papers is evolving to the use of calcium carbonate as a pigment/filler, and different types of sizing materials. In the case of these calcium carbonate filled, or neutral papers, adjustment of the pH downwards may be important so as to derive the maximum benefit of the enzyme system.

Other grades of paper which contain mechanical pulps (wood-containing grades) such as old newspapers or magazines are still generally made under acidic conditions, and increasing the pH of the pulp slurry higher than pH 7 can cause what is known as alkaline darkening. This effect is generally irreversible, and would dictate the use of a pH region less than 7. There are enzymes which work well in this range which are well known in the art.

The pH of the dislodging step may range from about pH 4 to about pH 10, preferably from about pH 4.5 to about pH 9.5, more preferably from about pH 5 to about pH 9, and most preferably from about pH 5.5 to about pH 8.5. The temperature of the dislodging step may range from about 25° C. to about 80° C., preferably from about 30° C. to about 70° C., and more preferably from about 35° C. to about 75° C. Where one or more enzymes are used, the conditions of pH and temperature should be compatible with the optimal activity of the enzyme(s).

The acidifying agent in the methods of the present invention can be a mineral acid such as sulphuric acid or phosphoric acid (added in the form of diluted acid). Also, a salt of a strong acid or weak base can be used, e.g., trisodium phosphate or dilute sodium silicate, the properties of which make it useful in the paper industry.

An organic acid (such as gluconic acid or citric acid) can also be used partly or entirely in order to adjust the balance between free calcium and sequestered calcium.

A surfactant may also be added during the dislodging step, or after this step, but before removal of the dislodged ink to facilitate removal of the ink, particularly by flotation. The surfactant may be a cationic surfactant, a nonionic surfactant, or any other surfactant useful in the methods of the present invention. The enzyme(s) and surfactant components of the dislodging agent are prepared by conventional means. The enzyme(s) and surfactant can be combined by mixing before addition or the components can be added or mixed into the slurry in any order of addition.

The surfactant is preferably nonionic in nature such as a higher aliphatic alcohol alkoxylate, aliphatic acid alkoxylate, higher aromatic alcohol alkoxylate, fatty acid amide of alkanolamine, fatty acid amide alkoxylate, propylene glycol alkoxylate, block or random copolymer of ethylene and propylene oxide, or higher alcohol polyethylene polypropylene block or random adducts. A wide variety of nonionic surfactants may be used as disclosed by, for example, Park et al., 1992, *Biotechnology and Bioengineering* 39:117–120 and EP 0 717 144 A1.

Commercially available nonionic surfactants useful in the present invention include Inkmaster® (Rhone-Poulenc, Inc.), Antarox® (Rhone-Poulenc, Inc.), Agepal® (Rhone-Poulenc, Inc.), Alkasurf® (Rhone-Poulenc, Inc.), Alkamide® (Rhone-Poulenc, Inc.), Alkamus® (Rhone-Poulenc, Inc.), Rhodasurf® (Rhone-Poulenc, Inc.), Hipochem® (High Point Chemicals), Lionsurf® (Lion Industries, Inc.), Nonatell® (Shell Oil Company), and Berocell® (EKA Nobel AB).

The amount of the surfactant required may range from about 0.02% to about 0.25%, preferably from about 0.03% to about 0.2%, more preferably from about 0.035% to about 0.1%, and most preferably from about 0.04% to about 0.075%, by weight of the pulp slurry.

The time required to allow substantially all of the paper fibers in the pulp slurry to come into contact with the enzyme(s) depends on the degree of dilution of the pulp slurry and the use of agitation. The determination of the appropriate amount of time needed is well within the skill of the art. Generally, the time can range from about 5 to 120 minutes, preferably from about 10 to about 90 minutes, more preferably from about 10 to about 60 minutes, and most preferably from about 15 to about 30 minutes. Decolorization of pulp slurry The decolorizing step may be conducted simultaneously with the pulping step or the deinking step, simultaneously with the pulping and the deinking steps, or separately from the pulping and the deinking steps. In a preferred embodiment, the decolorizing step is conducted as a separate step following the pulping and dislodging steps but before the deinking step. The aqueous pulp slurry is preferably transferred to a separate vessel such as a "dump chest".

The decolorizing step may be performed with one or more laccases in the presence of sufficient agitation to provide oxygen, and optionally but preferably in the presence of a chemical mediator.

The term "laccase" is defined herein as a family of multi-copper oxidases that catalyze the oxidation of a range of inorganic and aromatic substances (particularly phenols) with the concomitant reduction of oxygen to water. Laccases are defined by the Nomenclature Committee of the International Union of Biochemistry on the Nomenclature and Classification of Enzymes and listed as the enzyme subclass E.C. 1. 10.3.2.

In the methods of the present invention, any laccase may be used which possesses suitable enzyme activity at a pH and temperature appropriate for decolorizing a dye contained in the pulp. It is preferable that the laccase(s) is active over broad pH and temperature ranges.

The laccase(s) may have a pH optimum which ranges from about 3 to about 10, preferably from about 4 to about 9, more preferably from about 4.5 to about 8.5, and most preferably from about 5.5 to about 8.0.

The laccase(s) may have a temperature optimum which ranges from about 25° C. to about 80° C., preferably from about 30° C. to about 70° C., and more preferably from about 30° C. to about 60° C.

During the decolorization step, the pulp slurry preferably has a consistency in the range of about 0.5% to about 6% and more preferably about 2% to about 3.5%.

The time required to allow substantially all of the paper fibers in the pulp slurry to come into contact with the chemical mediator(s) and laccase(s) depends on the degree of dilution of the pulp slurry and the use of agitation. The determination of the appropriate amount of time needed is well within the skill of the art. Generally, the time can range from about 5 to about 120 minutes, preferably from about 10 to about 90 minutes, more preferably from about 10 to about 60 minutes, and most preferably from about 15 to about 30 minutes.

In the methods of the present invention, combinations of laccases may be used for decolorizing two or more dyes contained in the pulp, particularly where the presence of different dyes in the pulp requires different laccases with different substrate specificities.

The source of a laccase is not critical for decolorizing a dye contained in the pulp. Accordingly, the laccase(s) may be a plant, microbial, insect, or mammalian laccase.

In a preferred embodiment, the laccase(s) is a plant laccase. For example, the laccase(s) may be a lacquer, mango, mung bean, peach, pine, prune, or sycamore laccase.

In another preferred embodiment, the laccase(s) is an insect laccase. For example, the laccase(s) may be a Bombyx, Calliphora, Diploptera, Drosophila, Lucilia, Manduca, Musca, Oryctes, Papilio, Phorma, Rhodnius, Sarcophaga, Schistocerca, or Tenebrio laccase.

The laccase(s) is preferably a microbial laccase, such as a bacterial or a fungal laccase.

In another preferred embodiment, the laccase(s) is a bacterial laccase. For example, the laccase(s) may be an Acer, Acetobacter, Acinetobacter, Agrobacterium, Alcaligenes, Arthrobacter, Azotobacter, Bacillus, Comamonas, Clostridium, Gluconobacter, Halobacterium, Mycobacterium, Rhizobium, Salmonella, Serratia, Streptomyces, *E. coli*, Pseudomonas, Wolinella, or methylotrophic bacterial laccase.

In a more preferred embodiment, the laccase(s) is an Azospirillum laccase, and most preferably an *Azospirillum lipoferum* laccase.

In another preferred embodiment, the laccase(s) is a fungal laccase. For example, the laccase(s) may be a yeast laccase such as a Candida, Kluyveromyces, Pichia, Saccharomyces, Schizosaccharomyces, or Yarrowia laccase; or a filamentous fungal laccase such as an Acremonium, Agaricus, Antrodiella, Armillaria, Aspergillus, Aureobasidium, Bjerkandera, Cerrena, Chaetomium, Chrysosporium, Cryptococcus, Cryphonectria, Curvularia, Cyathus, Daedalea, Filibasidium, Fomes, Fusarium, Geotrichum, Halosarpheia, Humicola, Lactarius, Lentinus, Magnaporthe, Monilia, Monocillium, Mucor, Neocallimastix, Neurospora, Paecilomyces, Panus, Penicillium, Phanerochaete, Phellinus, Phlebia, Pholiota Piromyces, Pleurotus, Podospora, Pycnoporus, Pyricularia, Rigidoporus, Schizophyllum, Sclerotium, Sordaria, Sporotrichum, Stagonospora, Talaromyces, Thermoascus, Thielavia, Tolypocladium, or Trichoderma laccase.

In a more preferred embodiment, the laccase is a Coprinus, Myceliophthora, Trametes (Polyporus), Rhizoctonia, or Scytalidium laccase.

In a most preferred embodiment, the laccase is a *Coprinus cinereus, Myceliophthora thermophila, Trametes villosa* (*Polyporus pinsitus*), *Rhizoctonia solani,* or *Scytalidium thermophilum* laccase.

The laccase(s) may be obtained from the organism in question by any suitable technique, and in particular by use of recombinant DNA techniques known in the art (c.f. Sambrook, J. et al., 1989, Molecular Cloning, A Laboratory Manual, Cold Spring Harbor Press, Cold Spring Harbor, N.Y., USA). The use of recombinant DNA techniques generally comprises cultivation of a host cell transformed with a recombinant DNA vector, consisting of the product gene of interest inserted between an appropriate promoter and terminator, in a culture medium under conditions permitting the expression of the enzyme and recovering the enzyme from the culture. The DNA sequence may be of genomic, cDNA, or synthetic origin or any mixture of these, and may be isolated or synthesized in accordance with methods known in the art. The enzyme may also be obtained from its naturally occurring source, such as a plant or organism, or relevant part thereof. Furthermore, the laccase(s) may be obtained from commercial suppliers.

The laccase(s) is used in an amount effective to decolorize the dye(s) contained in a pulp. Thus, the dosage of the laccase(s) to be used in the methods of the present invention should be adapted to the nature and composition of the pulp in question as well as to the nature of the laccase(s) to be used.

The laccase(s) is typically added in an amount corresponding to about 0.01 to about 100 mg enzyme protein per kg of pulp, preferably about 0.1 to about 25 mg enzyme protein per kg of pulp, more preferably about 0.1 to about 10 mg enzyme protein per kg of pulp, and most preferably about 0.5 to about 5 mg enzyme protein per kg of pulp.

In terms of enzyme activity, the appropriate dosage of a given laccase will depend on the enzyme and the dye in question. The skilled person may determine a suitable enzyme unit dosage on the basis of methods known in the art. For purposes of the present invention, laccase activity may be determined in laccase units as LACUs or LAMUs. One LACU is defined as the amount of enzyme which oxidizes one micromole of syringaldazine per minute at pH 5.5, 30° C. in 25 mM sodium acetate buffer. One LAMU is defined as the amount of enzyme which oxidizes one micromole of syringaldazine per minute at pH 7.0, 30° C. in 25 mM Tris-HCl buffer.

The laccase(s) is preferably used in combination with a chemical mediator in the methods of the present invention. Any chemical mediator may be used which is a suitable mediator for the laccase in question. The term "chemical mediator" is defined herein as a chemical compound which acts as a redox mediator to effectively shuttle electrons between the laccase and the dye. Chemical mediators are also known as enhancers and accelerators in the art.

The chemical mediator may be a phenolic compound, for example, methyl syringate. The chemical mediator may also be an N-hydroxy compound, an N-oxime compound, or an N-oxide compound, for example, N-hydroxybenzotriazole, violuric acid, or N-hydroxyacetanilide. The chemical mediator may also be a phenoxazine/phenathiazine compound, for example, phenathiozine-10-propionate. The chemical mediator may further be 2,2'-azinobis-(3-ethylbenzothiazoline-6-sulfonic acid) (ABTS). Other chemical mediators are well known in the art. For example, the organic chemical compounds disclosed in WO 95/01426 are known to enhance the activity of a laccase.

The chemical mediator is preferably added to the pulp slurry in an amount of about 0.01% to about 5%, more preferably in an amount of about 0.1% to about 2%, and most preferably in an amount of about 0. 1% to about 1% of the dry weight of the pulp.

In the methods of the present invention, combinations of chemical mediators may be used for decolorizing two or more dyes contained in the pulp, particularly where the presence of different dyes in the pulp may require different laccases with different substrate specificities.

The dye contained in the pulp may be any dye which is a substrate of a laccase. The largest class of dyestuff used to achieve coloration of paper fall under the direct dye category. Within this broad heading are a variety of dye structures and chemical families. Traditionally, the Goldenrod color which has proven to be the classic example of intractability in removal of color from paper is of the stilbene category. Some of the other classes and the colors which they represent are benzidine, tolidine, and dianisidine (Color Index Direct Blue 1); J-Acid derivatives (Color Index Direct Red 81); trisazo and tetrakisazo (Color Index Direct Blue 75); and thiazol and thiazol-azo (Color Index Direct Yellow 28). Because the chemical structure of these classes are so disparate, it is not unexpected that their response to many of the milder bleaching/brightening agents varies greatly.

In a preferred embodiment, the dye is a benzidine, dianisidine, stilbene, tetrakisazo, thiazol. thiazol-azo, tolidine, or trisazo dye. In a more preferred embodiment, the dye is a stilbene dye.

The decolorization of the pulp slurry may be measured using any method known in the art which indicates the efficiency of color removal. Indices of color removal include Dye Removal Index (DRI), Bleaching Index (BI), and Color Stripping Index (CSI) all of which use the CIE L* a* b* method (Fluet and Shepperd, 1997, *Progress in Paper Recycling*/February 1997, 74–79). For purposes of the present invention, color removal is determined according to TAPPI Method T 524 om-94.

The laccase(s) to be used in the methods of the present invention may be in any suitable form, e.g., a dry powder, agglomerated powder, granulate, or a liquid. Granulates and agglomerated powders may be prepared by conventional methods, e.g., by spraying the laccase(s) onto a carrier in a fluid-bed granulator. The carrier may consist of particulate cores having a suitable particle size. The carrier may be soluble or insoluble, e.g., a salt (such as NaCl or sodium sulfate), a sugar (such as sucrose or lactose), a sugar alcohol (such as sorbitol), or starch. The laccase(s) may be contained in slow-release formulations. Methods for preparing slow-release formulations are well known in the art. Liquid enzyme preparations may, for instance, be stabilized by adding acceptable stabilizers such as a sugar, a sugar alcohol or another polyol, and/or lactic acid or another organic acid according to established methods.

In a preferred embodiment, the decolorizing step is conducted for about 30 minutes to about 120 minutes at about 30° C. to about 60° C.

Removal of Ink Particles, Dye, Toner, and/or Coating

The ink particles, dye, toner, and/or coating released from the pulp slurry are then separated from the pulp using any method known in the art, including flotation, water washing, centrifugal separation, screening, or any combination of the foregoing. A screening or coarse cleaning stage or stages can be utilized to remove contaminants such as glass, stone, metal, and staples. A centrifugal cleaning stage or stages can be utilized to remove light weight materials such as plastics. Typical processes for separating ink particles are described in Ferguson, L. D., *Deinking Chemistry: Part* 1, August 1992 *TAPPI Journal* pp. 75–83; in Ferguson, L. D., *Deinking Chemistry: Part* 2, July 1992 *TAPPI Journal pp.* 49–58; McBride, 1994, *Pulp and Paper* April, 1994, Miller Freeman Publishers, San Francisco, Calif., p. 44; and Spielbauer, J. L., *Deinking System Overview,* Voith, Inc., Appleton, Wis., pp. 1–9.

During deinking, other components conventionally used during deinking may be added such as brighteners, solvents, antifoam agents, and water softeners.

Recovery of Decolorized Pulp

In large-scale practice, the pulp suspension is generally then subjected to a washing step using a rotary drum filter which removes fine ink particles, filler particles, pulp fines, and soluble dyes which have been liberated during the preceding treatments. This process step also thickens the pulp at the same time. However, any washing method known in the art may be used. Depending on the type of pulp being processed, the pulp consistency after washing/thickening can be in the 1–5% region. Depending on the amount of washing/thickening desired, the pulp can be further thickened to 20–30% solids (high consistency) using a twin wire press (Andritz-Sprout-Bauer, Muncy, Pa.). Alternatively, a screw press can be used for this thickening stage. There are several manufacturers of screw presses which will increase pulp consistency from a low level (~5%) to higher levels (>20%). One of these units is manufactured by the Hymac Division of Kvaerner Industries. Other pulp machinery manufacturers like the Beloit Division of Harnishfeger Industries have also manufactured this type of pulp thickening unit.

The thickened pulp can be stored as is, and diluted before feeding forward to the paper machine. Alternatively, it can further treated at high consistency with a bleaching/brightening agent like hydrogen peroxide, in concert with other chemicals used as standard adjuvants for this bleaching/brightening method.

The pulp can also be diluted and treated with sodium hypochlorite if an oxidative step is required, or with sodium hydrosulfite or formamidine sulfinic acid (FAS) should a reductive treatment be desired. These treatments would be considered necessary if the earlier color removal/pulp washing step failed to achieve the desired results.

The present invention also relates to a pulp obtained by the methods of the present invention.

Methods for Producing Recycled Paper

The present invention further relates to methods for producing recycled paper from a pulp produced by the methods of the present invention. The deinked and decolorized pulp may be converted to paper using any of the methods known in the art.

The present invention is further described by the following examples which should not be construed as limiting the scope of the invention.

EXAMPLES

Example 1

Pulping, Decolorizing, and Deinking of Goldenrod Dyed Paper

Two types of Goldenrod dyed paper containing no print (Goldenrod Sample 1: Universal Premium Laser & Xerographic DP, 11205, United Stationers, Des Plaines, Ill.; Goldenrod Sample 2: Springhill Relay Plus, 50750; International Paper, Memphis, Tenn.) were each pulped in a Hobart mixer Model No. N-50 equipped with a 4 liter jacketed stainless steel bowl. To achieve laboratory repulping of the waste paper at this higher consistency, a spade type open mixing blade was used. This mixing blade was also supplied by Hobart. A total of 200 g of each paper was mixed to a consistency of approximately 14% in 1.2 liters of water pre-heated and maintained at 55° C. for 20 minutes to convert each paper to a pulp slurry.

Figure 1:
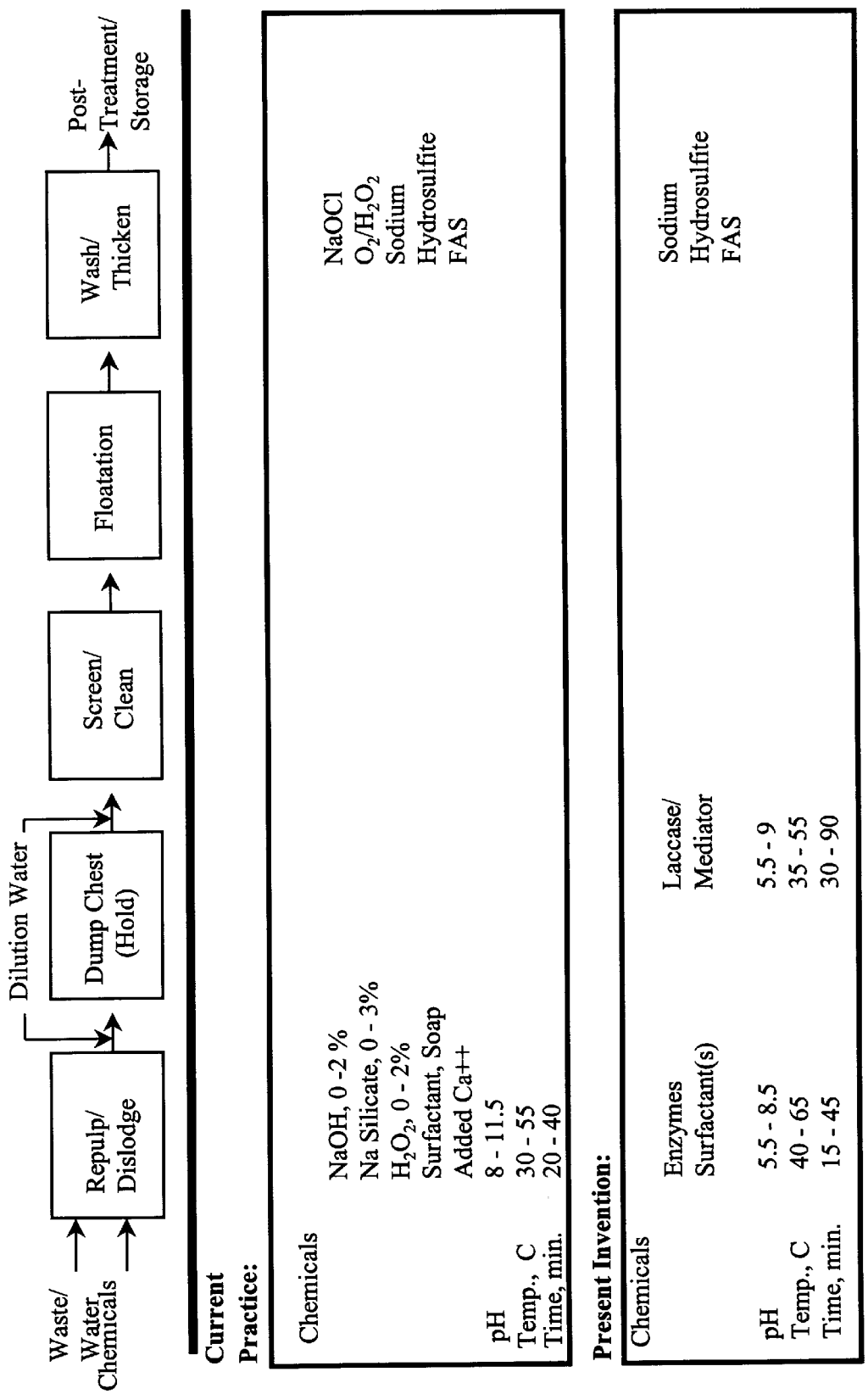
FIG. 1 shows a schematic diagram for deinking and decolorizing printed waste paper comparing conventional practice with the methods of the present invention.

The pH of each pulp slurry was adjusted to a pH in the range 7–8. Sample 1 was pH adjusted with saturated aqueous trisodium phosphate while sample 2 was pH adjusted with 85% phosphoric acid. A cocktail of hydrolytic enzymes and a surfactant were added to each pulp slurry. The cocktail was composed of 63 mg (0.032% on air-dry paper) of NOVOZYME™ 342™ (Lot CAP 2001, 600 ECU/g), and 68 mg (0.033% on air-dry paper) of AQUAZYME™ 240 L (Lot ADP 8001, 240 KNU/g). The enzymes were obtained from Novo Nordisk A/S, Bagsværd, Denmark. The surfactant was InkMaster™ 750 (Rhone-Poulenc, Inc., Marietta, Ga.). Agitation was continued for at least 20 minutes. Each pulp was diluted to approximately 3% consistency by adding an additional 5 liters of water at 50+° C. to each pulp slurry during the transfer to another vessel where stirring was possible. The transfer and dilution was performed to simulate a dump chest which normally follows the pulping stage as shown in FIG. 1.

Methyl syringate (Lancaster Fine Organics, Windham, N.H.), 150 mg, 0.075% on air-dry paper, or violuric acid (Aldrich Chemical Co., Milwaukee, Wis.), 126 mg, 0.063% on air-dry paper, was added to the diluted slurry. The choice of a lower weight % of violuric acid represented an equimolar amount of mediator used in both cases. The addition of mediator was followed by *Myceliophthora thermophila* laccase (Novosample NS1003, PPX 5806, 1000 LAMU/g) at nearly the same dosage of 0.057%. The pulp was stirred with sufficient agitation to assure saturation of the pulp with air for a period of 60–120 minutes at 37–52° C.

Each pulp slurry was added to a 17 liter Lamort deinking cell (E. & M. Lamort, Vitry La Francois, France) containing 8–9 liters of water preheated and maintained at 45° C., which raised the liquid level to within 2–3 cm of the top of the deinking cell. The deinking cell was equipped with a heater and a built-in rotor agitator to introduce air into the pulp slurry. The air bubbles collected the ink particles on the surface of the cell, which served to separate the ink from the pulp. The diluted pulp slurry was first agitated at approximately 500 rpm, and a 1 liter "zero time" sample was collected.

The deinking cell was filled to the top with water and the flotation cycle begun by increasing the rotor speed to 1000 rpm (measured with an optical tachometer). The foam generated ("rejects") was gently scraped off the top of the liquid into the collection trough surrounding the deinking cell. The rejects collected in the trough were saved, filtered through a tared filter paper, and dried. The weight of these rejects can be used to compare deinking runs. After 10 minutes, the agitator was slowed, and the pulp was drained into a vessel and used in a laboratory washing simulation. Before the washing process was begun, a 1 liter pulp sample was collected to serve as a 10 minute pulp sample.

As described earlier, large-scale pulp washing is accomplished by passing the slurry over a drum filter, which is covered with a metal or plastic screen material. Passing 1 liter amounts of the pulp slurry from the flotation stage through a 42 mesh Tyler screen (Fisher Scientific, Pittsburgh, Pa.) simulated the pulp washing step at laboratory scale. The pulp was manipulated until it achieved ~5% consistency. The thickened pulp was then pooled until all of the "deinked" pulp had been thickened. At the conclusion of the washing stage, the thickened pulp was stored for analysis.

The type of non-contact printed papers used in this study demonstrated that they can be readily deinked under the conditions employed during the repulping, flotation, and washing steps described earlier (See Jobbins and Franks, 1997, *TAPPI Journal* 80:73).

Example 2

Analysis of Decolorized Pulp Obtained from Goldenrod Dyed Paper

The optical properties of both the treated and untreated pulp samples described above were obtained using pulp pads dried under ambient conditions, and made according to TAPPI Standard Method T 218 om-91, "Forming Handsheets for Reflectance Testing of Pulp (Buchner Funnel Procedure)". The 15 cm pulp pads made using this procedure were analyzed for the CIE L*, a*, and b* using a Hunterlab Model 6000 Labscan Spectrocolorimeter (Hunter Associates Laboratory, Reston, Va.).

The results shown in Tables 1 and 2 demonstrated that using the Laccase:Mediator system (LMS) the Universal goldenrod paper fell along the Hunterlab a* color coordinate, due to the more difficult removal of the salmon hued dye. The yellow component of this dye system tended to be water soluble, and was removed to varying extents by dilution and washing alone.

Using methyl syringate as a mediator was preferable to the violuric acid molecule, since violuric acid tended to form a reddish hue which appeared to have affected the a* value of the pulp recovered from that treatment.

Although no attempt was made to optimize the conditions shown in Table 1, running the dye-stripping portion of the process longer than 60 minutes did appear to have some advantage, and using a higher pulp consistency at the same LMS addition levels also helped to improve the final result.

TABLE 1

Results for Universal Type 11205 Goldenrod Paper

| mg Novozym 342/mg AQUAZYME 240 L in Repulping Stage | Mediator (mg) Used in "Dump Chest" | mg. *Myceliophthora* Laccase used in "Dump Chest" | Results for Washed Pulp Pads | |
|---|---|---|---|---|
| | | | a* | L* |
| 60 mg/80 mg TERMAMYL | 0 (Control) | 0 (Control) | 11.16 | 88.5 |
| 63/68 | Methyl Syringate (150 mg) | 113 mg | 5.85 | 91.08 |
| 68/35 | Methyl Syringate (115 mg) | 106 mg | 3.08 | 92.6 |
| 65/35 | Violuric Acid (126 mg) | 115 mg | 12.25 | 87.25 |

*Dump Chest Treatment ran for 60 minutes at ambient temperature (37° C. at end).
**Dump Chest Treatment ran for 120 minutes at 52° C.

A more conventional goldenrod paper was used for the second part of these runs. It was surmised that the Springhill paper used a nitrostilbene dyestuff, which is more difficult to remove from papers using this dye. Nevertheless, some improvement was observed for the a* and b* values; no attempt was made to optimize these results, and the presence of the calcium carbonate filler made pH control for these runs difficult to achieve on a laboratory scale.

TABLE 2

Results for IP Springhill Type 50750 Goldenrod Paper

| mg Novozym 342/mg AQUAZYME 240 in Repulping Stage | Mediator (mg) Used in "Dump Chest" | mg. *Mycehophthora* Laccase used in "Dump Chest" | Results for Washed Pulp Pads | | |
|---|---|---|---|---|---|
| | | | L* | a* | b* |
| 60/35 | 0 (Control) | 0 (Control) | 84.55 | 11.24 | 61.06 |
| 69/35 | Methyl Syringate (155mg) | 116 | 85.44 | 10.24 | 58 |

*Paper made under alkaline conditions and required 85% phosphoric acid for neutralization The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

Various references are cited herein, the disclosures of which are incorporated by reference in their entireties.

What is claimed is:

1. A method for deinking and decolorizing a printed paper containing a dye, comprising:
    (a) pulping the printed paper to obtain a pulp slurry;
    (b) dislodging an ink from the pulp slurry in the presence of an amylase and cellulase;
    (c) decolorizing the dye contained in the pulp slurry with one or more laccases in the presence of oxygen and one or more chemical mediators;
    (d) separating the released ink from the pulp slurry; and
    (e) recovering the decolorized pulp.
2. The method of claim 1, which further comprises after step (a) diluting the pulp slurry at least about two-fold.
3. The method of claim 2, wherein the pulp slurry is diluted before step (b).
4. The method of claim 2, wherein the pulp slurry is diluted after step (b).
5. The method of claim 1, wherein the pulping step is conducted at a consistency of about 3% to about 25%.
6. The method of claim 1, wherein the pulping step is conducted at a pH of about 4.5 to about 10.
7. The method of claim 1, wherein the pulping step is conducted at a temperature of about 25° C. to about 75° C.
8. The method of claim 1, wherein the pulping step is conducted for about 20 minutes to about 120 minutes.
9. The method of claim 1, wherein the dislodging step is conducted at a consistency of about 3% to about 25%.
10. The method of claim 1, wherein the dislodging step is conducted at a pH of about 4.5 to about 10.
11. The method of claim 1, wherein the dislodging step is conducted at a temperature of about 25° C. to about 80° C.
12. The method of claim 1, wherein the dislodging step is conducted for about 5 minutes to about 120 minutes.
13. The method of claim 1, wherein steps (a) and (b) are conducted simultaneously.
14. The method of claim 13, wherein the pulping and dislodging steps are conducted at a consistency of about 3% to about 25%.
15. The method of claim 13, wherein the pulping and dislodging steps are conducted at a pH of about 4.5 to about 10.
16. The method of claim 13, wherein the pulping and dislodging steps are conducted at a temperature of about 25° C. to about 75° C.
17. The method of claim 13, wherein the pulping and dislodging steps are conducted for about 20 minutes to about 120 minutes.
18. The method of claim 1, wherein step (b) is further conducted in the presence of one or more enzymes selected from the group consisting of a hemicellulase, lipase, pectin methylesterase, protease, and xylanase.
19. The method of claim 8, wherein step (b), (c), or (d) is conducted in the presence of a surfactant.
20. The method of claim 19, wherein the surfactant is an anionic surfactant or a nonionic surfactant.
21. The method of claim 19, wherein the surfactant is added in an amount of about 0.02% to about 0.25% by weight of the pulp.
22. The method of claim 1, wherein the one or more laccases are selected from the group consisting of a bacterial, fungal, insect, and plant laccase.
23. The method of claim 22, wherein the fungal laccase is a filamentous fungal laccase selected from the group consisting of an Acremonium, Agaricus, Antrodiella, Armillaria, Aspergillus, Aureobasidium, Bjerkandera, Cerrena, Chaetomium, Chrysosporium, Cryptococcus, Cryphonectria, Coprinus, Curvularia, Cyathus, Daedalea, Filibasidium, Fomes, Fusarium, Geotrichum, Halosarpheia, Humicola, Lactarius, Lentinus, Magnaporthe, Monilia, Monociium, Mucor, Myceliophthora, Neocallimastix, Neurospora, Paecilomyces, Panus, Penicillium, Phanerochaete, Phellinus, Phlebia, Pholiota, Piromyces, Pleurotus, Podospora, Pycnoporus, Pyricularia, Rhizoctonia, Rigidoporus, Schizophyllum, Sclerotium, Scytalidium, Sordaria, Sporotrichum, Stagonospora, Talaromyces, Thermoascus, Thielavia, Tolypocladium, Trametes, and Trichoderma laccase.

24. The method of claim 1, wherein the one or more laccases are added to the pulp slurry in amounts of about 0.01 to about 100 mg enzyme protein per kg of pulp.

25. The method of claim 1, wherein the one or more chemical mediators are a phenolic compound.

26. The method of claim 25, wherein the chemical mediator is methyl syringate.

27. The method of claim 1, wherein the one or more chemical mediators are selected from the group consisting of N-hydroxy compound, N-oxime compound, N-oxide compound, phenoxazine compound, and phenathiazine compound.

28. The method of claim 27, wherein the chemical mediator is N-hydroxybenzotriazole, violuric acid, N-hydroxyacetanilide, or phenathiozine-10-propionate.

29. The method of claim 1, wherein the chemical mediator is 2,2'-azinobis-(3-ethylbenzthiazoline-6-sulfonic acid).

30. The method of claim 1, wherein the one or more chemical mediators are added to the pulp slurry in amounts of about 0.01% to about 5% of the dry weight of the pulp.

31. The method of claim 1, wherein the dye is one or more of the dyes selected from the group consisting of a benzidine, dianisidine, stilbene, tetrakisazo, thiazol, thiazolazo, tolidine, and trisazo dye.

32. The method of claim 1, wherein the dye is a stilbene dye.

33. The method of claim 1, wherein the decolorizing step is conducted at a consistency above about 0.5% to about 6%.

34. The method of claim 1, wherein the decolorizing step is conducted at a pH of about 3 to about 10.

35. The method of claim 1, wherein the decolorizing step is conducted at a temperature of about 25° C. to about 80° C.

36. The method of claim 1, wherein the decolorizing step is conducted for about 5 minutes to about 120 minutes.

37. The method of claim 1, wherein the released ink is separated from the pulp slurry by flotation, water washing, centrifugal separation, screening, or any combination of the foregoing.

38. The method of claim 1, further comprising (f) treating the recovered pulp of step (e) with a brightening agent.

39. The method of claim 1, wherein the dislodging step further dislodges a coating from the pulp.

40. The method of claim 39, wherein the separating step further removes the coating.

* * * * *